US010228456B2

(12) United States Patent
Runge et al.

(10) Patent No.: US 10,228,456 B2
(45) Date of Patent: Mar. 12, 2019

(54) DETERMINATION OF THE POSITION OF A VEHICLE ON OR ABOVE A PLANET SURFACE (71) Applicant: Deutsches Zentrum Für Luft-und Raumfahrt E.V., Köln (DE)

(72) Inventors: Hartmut Runge, München (DE); Robert Klarner, München (DE)

(73) Assignee: Deutsches Zentrum für Luft-und Raumfahrt e.V., Köln (DE)

(*) Notice: Subject to any disclaimer, the term of this patent is extended or adjusted under 35 U.S.C. 154(b) by 314 days.

(21) Appl. No.: 14/913,573

(22) PCT Filed: Sep. 24, 2014

(86) PCT No.: PCT/DE2014/100340
§ 371 (c)(1),
(2) Date: Feb. 22, 2016

(87) PCT Pub. No.: WO2015/043579
PCT Pub. Date: Apr. 2, 2015

(65) Prior Publication Data
US 2016/0202352 A1    Jul. 14, 2016

(30) Foreign Application Priority Data

Sep. 25, 2013  (DE) ........................ 10 2013 015 892

(51) Int. Cl.
G01S 13/06        (2006.01)
G01S 19/48        (2010.01)
G01S 19/49        (2010.01)
G01S 7/41         (2006.01)
G01S 13/86        (2006.01)
(Continued)

(52) U.S. Cl.
CPC .............. *G01S 13/06* (2013.01); *G01S 7/411* (2013.01); *G01S 13/86* (2013.01); *G01S 13/876* (2013.01);
(Continued)

(58) Field of Classification Search
CPC ........ G01S 13/06; G01S 13/86; G01S 13/867; G01S 13/876; G01S 19/48; G01S 19/49; G01S 5/0252; G01S 7/411
(Continued)

(56) References Cited

U.S. PATENT DOCUMENTS 5,661,486 A    8/1997  Faivre et al.
6,512,976 B1   1/2003  Sabatino et al.
(Continued)

FOREIGN PATENT DOCUMENTS

DE    102011119762 A1    6/2012
EP        1860456 A1    11/2007
(Continued)

OTHER PUBLICATIONS

Krzikalla, R., et al., "Mehr Sicherheit Durch Positionsbestimmung Mit Satelliten Und Landmarken", In: ATZ-Automobiltechnische Zeitschrift, 115, 2013, 01, S 48-52.
(Continued)

*Primary Examiner* — Timothy A Brainard
(74) *Attorney, Agent, or Firm* — Hoffmann & Baron, LLP (57) ABSTRACT A device includes a first means for determining a first position of a vehicle, a second means for determining a movement direction of the vehicle, a third means for providing a number of fixed point data that specify, at least for significant radar objects on a planet surface, radar signature thereof and position thereof, a radar system for scanning a current surrounding area of the vehicle and detecting radar data, wherein, for a number of radar objects present in the surrounding area, radar signatures thereof and relative positions thereof in relation to the vehicle are determinable from the radar data, and wherein the radar system is configured to determine a second position, and the first means is configured such that the first position is correctable based on the
(Continued)

second position and/or a warning is issuable if the first position and the second position differ by more than a predefined value.

18 Claims, 2 Drawing Sheets

(51) Int. Cl.
    *G01S 13/87*     (2006.01)
    *G01S 5/02*     (2010.01)

(52) U.S. Cl.
    CPC .............. *G01S 19/48* (2013.01); *G01S 19/49* (2013.01); *G01S 5/0252* (2013.01); *G01S 13/867* (2013.01)

(58) Field of Classification Search
    USPC ........................................................ 342/146
    See application file for complete search history.

(56) References Cited

U.S. PATENT DOCUMENTS 9,222,799 B1 * 12/2015 Bell ..................... G01C 23/00
2013/0103298 A1     4/2013 Becker et al.

FOREIGN PATENT DOCUMENTS

| | | |
|---|---|---|
| EP | 2211144 A1 | 7/2010 |
| WO | WO 97/43665 A1 | 11/1997 |

OTHER PUBLICATIONS

English translation of International Preliminary Report on Patentability issued in International Application No. PCT/DE2014/100340 dated Apr. 7, 2016.

* cited by examiner

DETERMINATION OF THE POSITION OF A VEHICLE ON OR ABOVE A PLANET SURFACE

CROSS-REFERENCE TO RELATED APPLICATIONS

This application is the U.S. National Phase of, and Applicant claims priority from, International Application No. PCT/DE2014/100340, filed 24 Sep. 2014, and German Patent Application No. DE 10 2013 015 892.3, filed 25 Sep. 2013, both of which are incorporated herein by reference in their entirety.

BACKGROUND

The invention relates to a device and to a method for determining the position of a vehicle on or above a planet surface, in particular in a transport route network on the planet surface. The term "vehicles" here is understood to mean aircraft, rail vehicles, ships, in particular motor vehicles (private cars, trucks, buses, etc.).

It is known that, for navigation purposes, today's vehicles are provided with satellite-based and/or inertia-based position determination systems.

Global navigation satellite systems or GNSS (English acronym) are systems for use on earth, in the air, or in a near-earth orbit for position determination and navigation by receiving the signals of navigation satellites. GNSS is a collective term for the use of existing and of future global satellite systems such as, for example, GPS (Global Positioning System), GLONASS (GLObal NAvigation Satellite System), GALILEO, or COMPASS). It is known that the satellite-based position determination systems are subject to errors (satellite position errors, time drift errors, ionosphere errors, troposphere errors, multipath-effect errors) that lead to inaccuracies in the determination of the position. These errors can be additive and enable a position determination with an accuracy of only 5 m to 150 m. Moreover, it is known that the signals of satellite position determination systems can be disturbed by interfering transmitters.

An inertial navigation system (English acronym INS) is a sensor system enabling the measurement of movements of bodies that move freely in space. Like the object to be monitored, the system also has a total of six kinematic degrees of freedom, of which three are translational and three are rotational, which are oriented relative to three unit vectors that are also orthogonal with respect to one another. Using this sensor system, the body coordinate system can be determined in real time and compared via a kinematic transformation to a fixed, previously known space coordinate system, which allows a use of the INS as navigation system. The main advantages here include that this navigation system can be operated without reference, and thus is also independent of any locating signals from the environment.

The term inertial navigation therefore is based on the fact that the acceleration and rotation rate sensors required for setting up an INS determine all the changes of the object position and orientation, based on accelerations that act on internally installed, quantitatively known masses (also referred to as seismic mass), which is based on the principle of mass inertia. The presence of a strong sensor drift, whose erroneous influence is cumulatively amplified during the course of a measurement, is an essential disadvantage of INS, primarily in the case of very low-priced sensors. In practice, one couples an INS with other navigational systems. For example, a combination with a Global Positioning System (GPS) yields absolute position indications at one second intervals, while the INS interpolates intermediate values. Such combined position determination systems can be found today in vehicles and aircraft. Inertia-based position determination systems are also subject to position errors (resulting particularly from the drift error in combination with, for example, the above-mentioned errors in GNSS systems).

However, inertial navigation is too expensive for mass use or use in private cars. Due to shadowing effects, multiple reception (reflections, multi-path) and disturbances (unintentional or also intentional caused by jamming transmitters) of the reception signal, the GNSS navigation does not always work in a problem-free and reliable way. Moreover, for example, the street coordinates in the available data sets (for example, from TomTom and Nokia "HERE," formally Navteq) are much too imprecise to keep a vehicle in the lane in the case of autonomous steering and to enable drive control.

Moreover, a position determination based on visual landmarks with the aid of prominent and precisely surveyed landmarks such as, for example, the tips of church steeples, poles and prominent buildings, is known. Photographic views or image sequences taken from the vehicle are compared to a surrounding area image data bank, the landmarks (control points) are found, the angles are determined from which the landmarks are seen by the vehicle, and, using the known coordinates of the control points and triangulation, the position of the vehicle is determined. However, this method works only if the view is suitable. At this time, a data bank with the coordinates of control points that can be visually identified satisfactorily from the vehicle does not exist.

The vehicle positioning by GNSS locating is not sufficiently accurate, and, alone, it is not sufficiently failure-proof and reliable. In addition, the road data have not been acquired sufficiently precisely and do not contain objects/features for a more precise referencing. For high-precision vehicle guidance, for example, in the case of future autonomously controlled private cars, aircraft, ships, rail vehicles, the robust determination of the current vehicle position with high position accuracy must be possible. Thus, in particular, in motor vehicles that are moving autonomously, driver-assistance systems for automatically staying in lanes require a multiply redundant and secured sensor system for high-precision position determination in real time.

SUMMARY

The problem of the invention is to provide a device and a method for improved determination of the position of a vehicle on or above a planet surface, in particular in a transport route network on the planet surface.

The invention results from the features of the independent claims. Advantageous refinements and designs are the subject matter of the dependent claims. Additional features, application possibilities and advantages of the invention result from the following description as well as from the explanation of embodiment examples of the invention, which are represented in the figures.

A device-related aspect of the problem is solved by a device for determining the position of a vehicle on or above a planet surface, in particular in a transport route network on the planet surface. The term "planet surface" here is understood to mean, in general, any surface of a planet, but, in particular, the surface of the earth. The term "transport route network" here is understood to mean, in particular, a road transport route network or a shipping lane network.

The proposed device includes a first means for determining a first position P1(t) of the vehicle, a second means for determining a movement direction BR(t) of the vehicle, a third means for providing a number n of fixed point data, wherein the fixed point data specify, at least for significant radar objects $FRO_i$ arranged in a stationary manner on the planet surface, the radar signature $RS_{FROi}$ thereof and the position $P_{FROi}$ thereof, where i=1, 2, . . . , n, and a radar system having a radar sensor arranged on the vehicle for scanning a current surrounding area of the vehicle using radio-frequency radiation and for continuously detecting radar data obtained in the process, wherein, for a number m of radar objects $RO_k(t)$ present in the surrounding area, the radar signatures $RS_k(t)$ thereof and the relative positions $\Delta P_{Ok(t)}$ thereof in relation to the vehicle can be determined from the radar data, where k=0, 1, 2, . . . , m. The radar system here is configured and set up in such a way that, in the fixed point data, depending on the first position P1(t), from the radar objects $FRO_i$, those radar objects $FRO_i^*$ with the associated radar signatures $RS_{FROi^*}$ and positions $P_{FROi}^*$ can be determined, whose positions $P_{FROi}^*$ are located in a predeterminable area, depending on the movement direction BR(t), around the current first position P1(t) of the vehicle; and moreover that the radar signatures $RS_{FROi^*}$ of the radar objects $FRO_i^*$ are compared with the radar signatures $RS_k(t)$ of the radar objects $RO_k(t)$, and in the process those radar objects $RO_k(t)^*$ for which: $RS_k(t)=RS_{FROi^*}$ can be determined, wherein, if this condition is met, it is assumed that for the radar objects: $RO_k(t)^*=FRO_i^*$, and for positions $P_{ROk(t)^*}$ of the radar objects $RO_k(t)^*$: $P_{ROk(t)^*}=P_{FROi^*}$, and moreover that on the basis of the radar data, the relative positions $\Delta P_{Ok(t)^*}$ of the respective radar objects $RO_k(t)^*$ relative to the vehicle are determined, and that, on the basis in each case of the positions $P_{ROk(t)^*}=P_{FROi^*}$ and the relative positions $\Delta P_{Ok(t)^*}$, a second position P2(t) of the vehicle is determined. Finally, the first means is configured and set up in such a way that the first position P1(t) of the vehicle can be corrected on the basis of the determined second position P2(t) and/or a position warning can be issued if the first position P1(t) and the second position P2(t) differ from one another by more than a predefined limit value.

The first means is preferably a satellite-based or inertia-based position determination system. The first means therefore enables a determination of the first position P1(t) with a given position inaccuracy of $\Delta P1(t)$. As explained in the introduction, this position inaccuracy is typically in a range of ±5 m to ±100 m.

The second means advantageously includes a magnetic field sensor and/or an inertial system and/or a GNSS system. The movement direction or the travel direction is typically determined in contemporary vehicles in any case and is provided in an advantageous refinement by the corresponding vehicle system.

The third means provides the fixed point data. These fixed point data specify, at least for significant radar objects ($FRO_i$) arranged in a stationary manner on the planet surface, the radar signature ($RS_{FROi}$) thereof and the positions ($P_{FROi}$) thereof. The positions $P_{FROi}$ are here advantageously indicated with a position accuracy in the range of <50 cm, <30 cm, <25 cm, <10 cm, or <5 cm. The radar signature $RS_{FROi}$ depends in particular on the size, the shaping and the materials of which the radar object $FRO_i$ consist, and enables in particular an identification and differentiation of individual radar objects $FRO_i$.

In the present case, the radar objects $FRO_i$ are advantageously objects that reflect the impinging radio-frequency radiation (microwaves). The main reflected beam angle of the backscattered radar energy here depends on the dielectric properties and the mechanical properties of the respective radar object $FRO_i$. Using a radar sensor, the best detected surfaces are metal surfaces that are oriented so that they directly reflect incident microwaves from the radar. For the present application, advantageously only radar objects $FRO_i$ that can be acquired or seen from the vehicle by the radar system are used, since they have an amplitude that is clearly greater than the noise level or the backscattering of the background. In the present case, they are therefore referred to as "significant" radar objects. Advantageously, on the planet surface, adjacently arranged radar objects are selected (and thus relative to the radar objects $FRO_i$ of the fixed point data) so that they have different and thus easily and unequivocally identifiable radar signatures $RS_{FROi}$. This simplifies an unequivocal identification of the radar objects $FRO_i$.

Advantageously, the fixed point data are generated on the basis of radar data in which the transport route network and the radar objects $FRO_i$ arranged therein are represented in top view. Advantageously, the radar data are acquired here by using aircraft-borne or satellite-borne radar sensors. For this purpose, methods are known by which radar objects $FRO_i$ can be acquired by radar satellites or aircraft-borne radar sensors with a position accuracy of a few centimeters, in particular up to 2-10 cm. An area-wide determination of radar objects $FRO_i$ is thus feasible within a relatively short time (a few weeks) for entire countries or continents, so that it can be ensured that the fixed point data are sufficiently up-to-date.

High-precision absolute coordinates of the radar objects $FRO_i$ from satellite data can thus be determined very cost effectively worldwide. While optical images have a relatively uniform brightness, in radar images objects made of metal (guardrails, poles, lamps, sign gantries, bridge railings appear much more strongly than the background image with the road cover and the vegetation. Therefore, they are considerably easier to identify. Moreover, building edges and corners are very good scatterers. This often results in so-called "radar point targets," which are significantly smaller than a resolution cell (1 m×1 m TerraSAR-X Spotlight Mode image). The work of Balss et al. (DLR MF-SAR) has shown that such "point targets" can be determined in TerraSAR-X and TanDEM-X radar images with an accuracy of a few centimeters (see also (http://elib.dlr.de/82537/).

Naturally, the radar signatures of the radar objects $FRO_i$, acquired in top view, depending on the concrete application, first have to be converted into the radar signatures $RS_{FROi}$ which can be detected by the vehicle. For example, in the case of an application for motor vehicle transport, the radar sensor of the motor vehicle acquires the radar objects $FRO_i$ typically in a side view, so that the radar signatures acquired in top view have to be converted into radar signatures $RS_{FROi}$ that have the radar objects $FRO_i$ in side view. Naturally, the above-mentioned easy identifiability of the radar objects $FRO_i$ by corresponding radar signatures $RS_{FROi}$, and the requirement that the radar amplitude acquired by the radar sensor is clearly above the noise level or the backscattering of the background, in this case relate to side views of the radar objects $FRO_i$ and to those views of the radar objects $FRO_i$ that are acquired by the radar sensor arranged on the vehicle, respectively.

Advantageously, special radar reflectors, as radar objects $FRO_i$, are added in appropriate positions and at appropriate spacings on the planet surface, for example, along roads of a highway network. In this way, it is possible to ensure that along certain routes of the highway network, a continuous determination of the second position P2(t) with a corresponding high position resolution is possible. This is advantageous particularly for driver assistance systems of motor vehicles which require a high-precision determination of the position of the vehicle (for example, autonomous driving).

The radar system advantageously includes an evaluation computer, using which first, on the basis of the current first position P1(t) determined by the first means, in the fixed point data P1(t), a determination is made, from the radar objects $FRO_i$ stored there, of those radar objects $FRO_i^*$ with the associated radar signatures $RS_{FROi^*}$ and positions $P_{FROi^*}$, whose positions $P_{FROi}^*$ are in a predeterminable range, depending on the movement direction BR(t), around the current first position P1(t) of the vehicle. With the "error-affected" first position P1(t) an approximate position of the vehicle is available. This "approximate" first position P1(t) is used only for selecting from the fixed point data those radar objects $FRO_i^*$ with the associated radar signatures $RS_{FROi^*}$ and exact positions $P_{FROi^*}$ that should be detectable from the vehicle independently of the current movement direction (travel direction in the case of motor vehicles) of the first position P1(t). These selected radar objects $FRO_i^*$ are marked with a star in the present case.

The selected radar objects $FRO_i^*$ and the radar signatures $RS_{FROi^*}$ thereof are moreover compared by the radar system/evaluation computer with the radar signatures $RS_k(t)$ of the radar objects $RO_k(t)$ that were currently acquired by the radar sensor. Here, those radar objects $RO_k(t)^*$ whose radar signature $RS_k(t)$ corresponds to a radar signature $RS_{FROi^*}$, i.e., for which: $RS_k(t)=RS_{FROi^*}$, are determined. If this condition has been met, it is assumed, furthermore, that for the radar objects: $RO_k(t)^*=FRO_i^*$, and for positions $P_{ROk(t)^*}$ of the radar objects $RO_k(t)^*$: $P_{ROk(t)^*}=P_{FROi^*}$. In other words, to the extent that the comparison of a radar signature $RS_k(t)$ acquired by the radar sensor with a selected radar signature $RS_{FROi^*}$ results in a clear agreement, an identification of the associated radar object $FRO_i^*$ in the radar data acquired by the radar sensor is assumed.

If, in the comparison, no unequivocal identification of a radar signature $RS_{FROi^*}$ is achieved, the acquisition of current radar data is continually pursued by using the radar sensor as is the subsequent above-described evaluation until at least one radar object $FRO_i^*=RO_k(t)$ has been identified unequivocally.

An advantageous refinement of the device is characterized in that the fixed point data include optical data $OD_i$ for at least some significant radar objects $FRO_i$ which visually characterize the corresponding radar objects $FRO_i$, in that the radar system has an optical sensor for the continuous acquisition of image data BD(t) of the current surrounding area of the vehicle, and in that the radar system is configured and set up in such a way that the image data BD(t) are used for the verification of radar objects $RO_k(t)$ and $FRO_i^*$ detected in the current surrounding area of the vehicle. In this refinement, an additional optical verification of a radar object $FRO_i^*=RO_k(t)$ therefore occurs. As a result, the robustness and the reliability of the determination of the second position P2(t) are increased. Advantageously, the image data BD(t) acquired by the optical sensor also have an infrared light component. By the identification of at least one radar object $FRO_i^*=RO_k(t)^*$, the position $P_{ROk(1)^*}=P_{FROi^*}$ associated with this radar object is known with high position accuracy from the fixed point data.

Moreover, the radar system is configured and set up according to the invention in such a way that, on the basis of the radar data acquired by the radar sensor, the relative positions $\Delta P_{Ok(t)^*}$ of the respective radar objects $RO_k(t)^*=FRO_i^*$ relative to the vehicle are determined. For this purpose, today's radar sensors allow a distance determination with an accuracy of a few centimeters and an angular resolution of 1° or less. Thus, by triangulation (position, distance, angle) in each case on the basis of the respective positions $P_{ROk(t)^*}=P_{FROi^*}$ and the associated relative positions $\Delta P_{Ok(t)^*}$, a second position P2(t) of the vehicle is determined. If only one radar object $RO_k(t)^*=FRO_i^*$ is identified, one gets, from the position $P_{ROk(t)^*}=P_{FROi^*}$, from the distance determined from the radar data, and from the angle relative to the one radar object $RO_k(t)^*=FRO_i^*$, the position P2(t) with a position accuracy in the range of 2 to 50 cm, for example. If several radar objects $RO_k(t)^*=FRO_i^*$ are identified, then one gets, from the corresponding positions $P_{ROk(t)^*}=P_{FROi^*}$, and from the distances and angles determined from the radar data (horizontal angles/azimuth angles), first several second positions $P2_k(t)$ from which the second position P2(t) is determined, for example, by averaging and other algorithms.

The first means is configured and set up according to the invention in such a way that the first position P1(t) of the vehicle can be corrected on the basis of the determined second position P2(t) and/or a position warning can be issued if the first position P1(t) and the second position P2(t) differ from one another by more than a predefined limit value.

Advantageously, a correction of the first position P1(t) of the vehicle on the basis of the determined second position P2(t) occurs only if a difference in the values |P1(t)−P2(t)| exceeds a predefined first limit value. This first limit value is advantageously determined by the position inaccuracy of the second position P2(t). Advantageously, in addition, a position warning is issued if the difference in the values |P1(t)−P2(t)| exceeds a second limit value. As a result, the driver of the vehicle is at least notified that the device has detected a difference between the first position P1(t) and the second position P2(t) that goes beyond the second limit value.

The proposed device is thus used, in particular, for a position update of the first means, i.e., of the first position P1(t) determined by the first means, by a second position P2(t) which is determined on the basis of fixed point data, i.e., high-precision radar control points (radar objects FROi), and travel time and angle measurements determined by the radar sensor and radar signatures acquired by triangulation. For the detection and correct correlation of the radar objects $FRO_i$ to the radar objects $RO_k(t)$ detected by the radar sensor, the device needs to know the approximate position (first position P1(t)).

The proposed device makes it possible to construct a worldwide control point network of radar objects $_{FROi}$ along the most important roads, for example, from already available and archived radar images. This method is particularly cost effective, since no in-situ measurements or expensive overflying operations are needed. As a result, the possibility of high-precision navigation that is independent of GNSS can be created, even for regions of the world that are remote or difficult to access.

The radar sensors needed on the vehicle (near-range radar, long-range radar LLR, multi-mode radar) are in any case often already present in modern road vehicles for collision warning. For operation during daylight, cameras can also be used for recording and surveying the control points.

The advantages of the proposed device are that the device works independently of weather and lighting conditions, and the distribution and the density of the radar objects $FRO_i$ on the planet surface are much clearer (more selective and prominent) than with optical methods.

The invention relates moreover to a vehicle, in particular a motor vehicle, with a device as described above.

A method-based aspect of the problem is solved by a method for determining the position of a vehicle on or above a planet surface, in particular in a transport route network on the planet surface.

The proposed method has the following steps: determination of a first position P1(t) of the vehicle; determination of a movement direction BR(t) of the vehicle; provision of a number n of fixed point data, wherein the fixed point data specify, at least for significant radar objects ($FRO_i$) arranged in a stationary manner on the planet surface, the radar signature ($RS_{FROi}$) thereof and the position ($P_{FROi}$) thereof, where i=1, 2, ..., n; scanning of a current surrounding area of the vehicle by using radio-frequency radiation and continuous acquisition of radar data obtained in the process, wherein, from the radar data, for a number m of radar objects $RO_k(t)$ present in the surrounding area, the radar signatures $RS_k(t)$ thereof and the relative positions $\Delta P_{Ok(t)}$ thereof in relation to the vehicle are determined, where k=0, 1, 2, ..., m; in the fixed point data, depending on the first position P1(t), from the radar objects $FRO_i$, determination of those radar objects $FRO_i^*$ with the associated radar signatures $RS_{FROi^*}$ and positions $P_{FROi^*}$, whose positions $P_{FROi^*}$ are located in a predeterminable range, depending on the movement direction BR(t), around the current first position P1(t) of the vehicle; comparing of the radar signatures $RS_{FROi^*}$ of the radar objects $FRO_i^*$ with the radar signatures $RS_k(t)$ of the radar objects $RO_k(t)$, and in the process determination of those radar objects $RO_k(t)^*$ for which: $RS_k(t)=RS_{FROi^*}$, wherein, if this condition has been met, it is assumed that for the radar objects: $RO_k(t)^*=FRO_i^*$, and for positions $P_{ROk(t)^*}$ of the radar objects $RO_k(t)^*$: $P_{ROk(t)^*}=P_{FROi^*}$; based on the radar data, determination of the relative positions $\Delta P_{Ok(t)^*}$ of the respective radar objects $RO_k(t)^*$ in relation to the vehicle; and on the basis in each case of the positions $P_{ROk(t)}^*$ and the relative positions $\Delta P_{Ok(t)^*}$ determination of a second position P2(t) of the vehicle, wherein the first position P1(t) of the vehicle is corrected on the basis of the determined second position P2(t) and/or a position warning is issued if the first position P1(t) and the second position P2(t) differ from one another by more than a predefined limit value.

A refinement of the proposed method is characterized in that the fixed point data are generated on the basis of remote exploration radar data, in which the planet surface and the radar objects $FRO_i$ arranged thereon are imaged in a top view.

A refinement of the proposed method is characterized in that the remote exploration radar data are acquired by an aircraft-borne or a satellite-borne radar sensor.

A refinement of the proposed method is characterized in that the fixed point data provided include optical data $OD_i$ for at least some significant radar objects $FRO_i$, which visually characterize the corresponding radar objects $FRO_i$, in that, with an optical sensor, image data BD(t) of the current surrounding area of the vehicle are continuously acquired, and the image data BD(t) are used for the verification of radar objects $RO_k(t)$ detected in the current surrounding area of the vehicle.

Additional advantageous refinements and advantages result from an analogous and corresponding application of the explanations made above in connection with the proposed device.

With the present invention, an additional method, which, in particular, supplements the established methods such as GNSS, is described, which provides high-precision coordinates and position data for the orientation of the vehicle. As a result, the position determination becomes safer, more reliable, more robust and more accurate. This is a requirement in particular for the application in autonomous operation of vehicles (road vehicles, rail vehicles, aircraft).

The problem of the invention is moreover solved by a computer system, with a data processing device, wherein the data processing device is designed so that an above-described method is carried out on a data processing device.

In addition, the problem of the invention is solved by a digital storage medium with electronically readable control signals, wherein the control signals can cooperate with a programmable computer system so that an above-described method is carried out.

Furthermore, the problem of the invention is solved by a computer program product with a program code stored on a machine-readable support for carrying out an above-described method when the program code is executed on a data processing device.

Finally, the invention relates to a computer program with program codes for carrying out an above-described method when the program runs on a data processing device. For this purpose, the data processing device can be designed as any computer system known from the prior art.

Further advantages, features and details result from the following description, in which—optionally in reference to the drawings—at least one embodiment example is described in detail. Identical, similar and/or functionally equivalent parts are provided with the same reference numerals.

DETAILED DESCRIPTION

As an example embodiment, first an add-on and independently operating navigation system for vehicles is presented, which is all-weather and night capable, and which continually monitors, and, if needed, improves position data already present in the vehicle and issues a warning if serious deviations in the determined position data occur. The applications of this embodiment example lie in the navigation of vehicles of all types (private cars, trucks, in particular autonomous vehicles, ships, aircraft, drones, etc.), i.e., in cases where an interference resistance is important and several systems working as independently of one another as possible continually compare their respective position results to one another. An important application is in so-called "driver assistance systems" which allow completely autonomous navigation and driving of a motor vehicle.

In order to achieve all-weather and night capacity, an automotive radar is used, similar to the one already in use for so-called lane change assistance and for collision avoidance in vehicles. The automotive radar is used for measuring the range and the horizontal viewing angle (azimuth) of a prominent radar object and for measuring its radar signature in the viewing area of the road. For the evaluation, radar objects that can be seen easily with the radar sensor are selected. The radar sensor as a rule acquires metal objects such as traffic signs, sign gantries, light poles, guardrails, noise protection walls, as well as general building edges.

The coordinates of the radar objects/control points relate preferably to point sources on such objects made of metal, which are known precisely: by the proposed device, so that, by using the radar measurement (range and angle in relation to the radar object), the vehicle position can be determined. If several radar objects/control points can be seen simultaneously by the radar sensor, then, by triangulation, one's own position can be determined even more precisely and the weighting of the measured value is higher than with the other navigation systems.

In a preparatory step, a control point database (fixed point data) for radar objects (and optical sensors) is constructed. It contains the precise coordinates of the prominent points (so-called radar reflectors), which as a rule are visible from the road. The proposed device in the vehicle uses the current (and possibly only approximately known) position data of the vehicle (first position P1(t)) which is supplied and which is to be verified (by other systems), and extracts from the control point database the control point/fixed point data that are presumably easily seen from the vehicle, as well as their coordinates.

The automotive radar acquires the radar objects in the surrounding area and, with the corresponding coordinates from the fixed point data, determines approximately their position and compares them to the control point information extracted from the database. If the difference does not exceed a predeterminable error measure, then it is assumed that a subset of the radar objects stored in the database was detected. So-called "radar clutter," that is to say back scattering from other objects, but also interferences, must be eliminated in this process and not be used. The proposed radar method has advantages, since the control point/radar objects can be detected more easily here than in an optical image.

If it is ensured that the automotive radar has the correct control points/radar objects in the viewing area, the position determination process is reversed and the high-precision positions of the control points/radar objects are used in order to determine the vehicle position.

The construction of the control point database with the fixed point data can occur using measurement vehicles. A measuring vehicle equipped with high-precision orientation and position sensors travels all the relevant roads, and, using a high-precision automotive radar, it acquires all the prominent/significant radar objects in the surrounding area of the road. The measurement vehicle can precisely determine the coordinates of the radar objects. The vehicles, like the device proposed later, in fact only require in addition a relatively cost-effective orientation and position sensor system. Thus, an investment is made in expensive but one-time "learning and calibration trips" in order to save effort in the mass-produced product.

If one wants to avoid the effort of driving over all the roads, it would be possible to fall back on "Google Street View" image data, for example. Using object recognition software, the control point/radar objects are identified, and using available information (coordinates of the receiving location), the coordinates of the control point/radar objects are also determined. By using a simulator, it is possible to estimate how the automotive radar later "sees" the control points. In this manner, objects are identified that are known from the optical image measurements and made available for night travel with the automotive radar. Since no new data have to be collected, this is presumably the most cost effective method for constructing control point databases/fixed point data.

If a measurement of the control point/radar objects on site is not possible and if no Street View data are available, as is the case, for example, for legal reasons in some countries such as China or in a military use area ("off-road"), image data from SAR Radar satellites, such as, for example, the German TerraSAR-X satellites, can be used in order to determine high-precision coordinates of the control point/radar objects $FRO_i$. Progress in the technology has made it possible to indicate coordinates of the image pixel with only a few centimeters of error. However, the problem is that the radar objects are not distributed evenly in all directions, and therefore, when viewed from different directions (from the road or from above), they can exhibit very different levels of brightness. In order to be able to use the satellite data nonetheless, the following three possibilities exist, which can also be combined.

a) A combination with data of the radar measurement trips. It would be possible to align, i.e. match, the radar objects found by using the radar measurement vehicles with those from the satellite measurement, and then use the more accurate coordinates of the satellite measurement. The matching is also referred to as "sensor fusion."

b) A combination with data from the camera measurement trips (Google Street View). One uses the radar objects found in the optical data, which are known as "solid" radar scatterer/reflectors (for example, sign gantries) and matches these with the satellite data. By using models concerning the radar back scattering behavior of these objects, it can be simulated how the KFZ radar presumably "sees" the objects. This option is favored.

c) A combination with optical satellite data. If the area is not accessible, the control point/radar objects have to be identified both in satellite images of radar satellites and also of optical satellites, and the presumed radar signature for the view from the road must be determined by simulation. This is not too expensive, as one limits oneself to well-known objects that always occur in the vicinity of a road (signs, bridges, guardrails, power and light poles).

An operational update of the control point database with the fixed point data is possible using so-called "crowd sourcing." In order to always keep the fixed point data current, unusual features are stored by the proposed device in the vehicle in a "error memory" and communicated from time to time (for example, in a database update) to a provider. A distinction is made here between the following cases:

a) radar objects that are not visible from many vehicles
b) radar objects that no longer seem to be present at all
c) radar objects that are ranked prominent by many vehicles but that are not recorded in the database.

Figure 1:
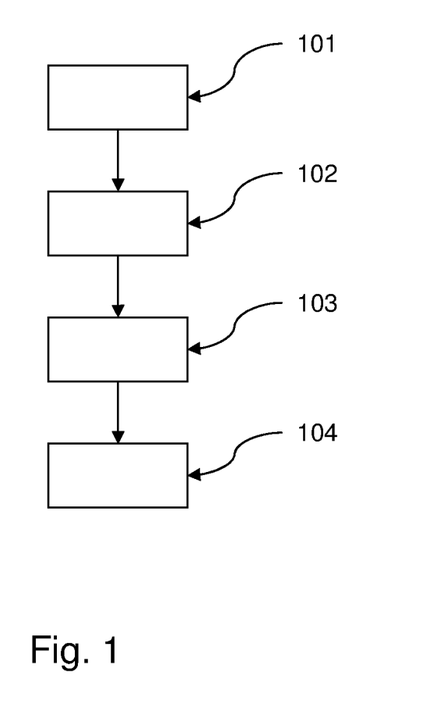
FIG. 1 shows a diagrammatic representation of a proposed device.

FIG. 1 shows a diagrammatic representation of a proposed device for determining the position of a vehicle on or above a planet surface, in particular a transport route network on the planet surface, including: a first means 101 for determining a first position P1(t) of the vehicle; a second means 102 for determining a movement direction BR(t) of the vehicle; a third means 103 for providing a number n of fixed point data, wherein the fixed point data specify, at least for significant radar objects ($FRO_i$) arranged in a stationary manner on the planet surface, the radar signature ($RS_{FROi}$) thereof and the position ($P_{FROi}$) thereof, where i=1, 2, . . . , n; a radar system 104 with a radar sensor arranged on the vehicle for scanning a current surrounding area of the vehicle by radio-frequency radiation and for the continuous acquisition of radar data obtained in the process, wherein, from the radar data, for a number m of radar objects $RO_k(t)$ present in the surrounding area, the radar signatures $RS_k(t)$ thereof and the relative positions $\Delta P_{Ok(t)}$ thereof relative to the vehicle can be determined, where k=0, 1, 2, ..., m, and wherein the radar system 104 is configured and set up in such a way that, in the fixed point data, depending on the first position P1(t), a determination is made, from the radar objects $FRO_i$, of those radar objects $FRO_i^*$ with the associated radar signatures $RS_{FROi^*}$ and positions $P_{FROi^*}$, whose positions $P_{FROi}^*$ are in a predeterminable range, depending on the movement direction BR(t), around the current first position P1(t) of the vehicle, the radar signatures $RS_{FROi^*}$ of the radar objects $FRO_i^*$ are compared with the radar signatures $RS_k(t)$ of the radar objects $RO_k(t)$, and in the process those radar objects $RO_k(t)^*$ are determined for which: $RS_k(t)=RS_{FROi^*}$, wherein, if this condition is met, it is assumed that, for the radar objects: $RO_k(t)^*=FRO_i^*$ and for positions $P_{ROk(t)}$ of the radar objects $RO_k(t)^*$: $P_{ROk(t)^*}=P_{FROi^*}$, on the basis of the radar data, the relative positions $\Delta P_{Ok(t)^*}$ of the respective radar objects $RO_k(t)^*$ relative to the vehicle are determined, and on the basis in each case of the positions $P_{ROk(t)^*}=P_{FROi^*}$ and of the relative positions $\Delta P_{Ok(t)^*}$, a second position P2(t) of the vehicle is determined; wherein the first means 101 is configured and set up so that the first position P1(t) of the vehicle can be corrected on the basis of the determined second position P2(t) and/or a position warning can be issued if the first position P1(t) and the second differ from one another by more than a predefined limit value.

Figure 2:
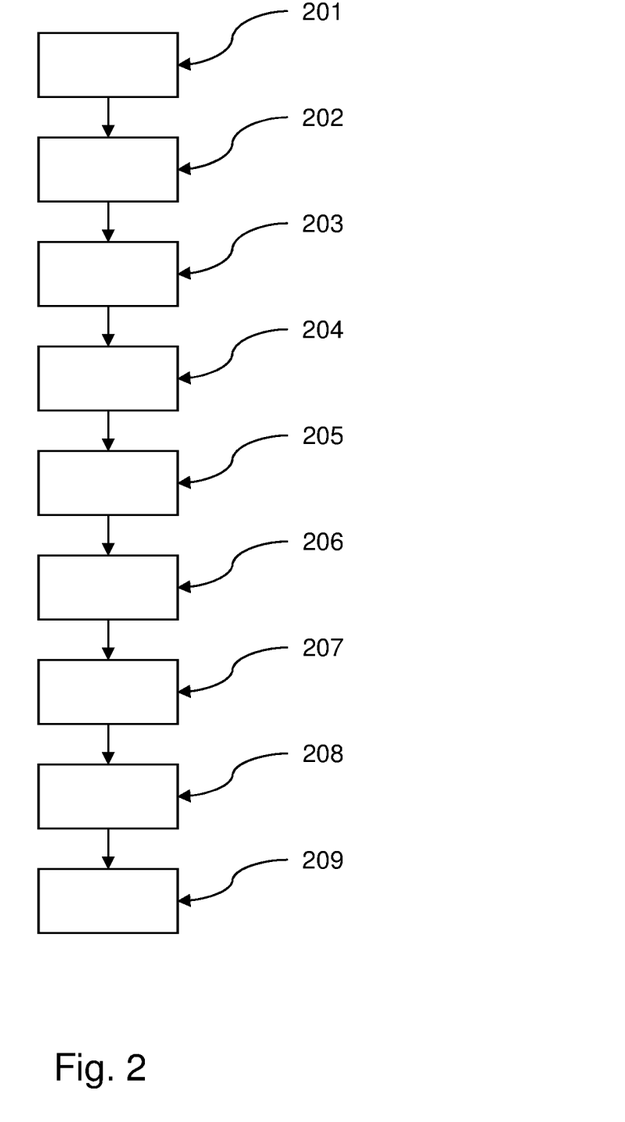
FIG. 2 shows a diagrammatic representation of a flow-chart of a proposed method.

FIG. 2 shows a diagrammatic representation of a flowchart of a proposed method for determining the position of a vehicle on or above a planet surface, in particular in a transport route network on the planet surface, with the following steps. In a first step 201, a determination of a first position P1(t) of the vehicle occurs. In a second step 202, a determination of a movement direction BR(t) of the vehicle occurs. In a third step 203, a provision of a number n of fixed point data occurs, wherein the fixed point data specify, at least for significant radar objects ($FRO_i$) arranged in a stationary manner on the planet surface, the radar signature ($RS_{FROi}$) thereof and the position ($P_{FROi}$) thereof, where i=1, 2, ..., n. In a fourth step 204, a scanning of a current surrounding area of the vehicle occurs by radio-frequency radiation and continuous acquisition of radar data obtained in the process occurs, wherein, from the radar data, for a number m of radar objects $RO_k(t)$ present in the surrounding area, the radar signatures $RS_k(t)$ thereof and the relative positions $\Delta P_{Ok(t)}$ thereof relative to the vehicle are determined, where k=0, 1, 2, ..., m. In a fifth step 205, in the fixed point data, depending on the first position P1(t), from the radar objects $FRO_i$, a determination occurs of those radar objects $FRO_i^*$ with the associated radar signatures $RS_{FROi^*}$ and positions $P_{FROi}$ whose positions $P_{FROi}^*$ are in a predeterminable area, depending on the movement direction BR(t), around the current first position P1(t) of the vehicle. In a sixth step 206, a comparison of the radar signatures $RS_{FROi^*}$ of the radar objects $FRO_i^*$ with the radar signatures $RS_k(t)$ of the radar objects $RO_k(t)$ occurs, and in the process, a determination occurs of those radar objects $RO_k(t)^*$ for which: $RS_k(t)=RS_{FROi^*}$, wherein, if this condition is met, it is assumed that, for the radar objects: $RO_k(t)^*=FRO_i^*$, and for positions $P_{ROk(t)^*}$ of the radar objects $RO_k(t)^*$: $P_{ROk(t)^*}=P_{FROi^*}$. In a seventh step 207, on the basis of the radar data, a determination of the relative positions $\Delta P_{Ok(t)^*}$ of the respective radar objects $RO_k(t)^*$ relative to the vehicle occurs. In an eighth step 208, on the basis in each case of the positions $P_{ROk(t)^*}$ and of the relative positions $\Delta P_{Ok(t)^*}$, a determination of a second position P2(t) of the vehicle occurs. In a ninth step 209, the first position P1(t) of the vehicle is corrected on the basis of the determined second position P2(t) and/or a position warning is issued if the first position P1(t) and the second position P2(t) differ from one another by more than a predefined limit value.

Although the invention has been illustrated and explained in detail by using preferred example embodiments, the invention is nonetheless not limited by the disclosed examples, and other variations can be derived therefrom by the person skilled in the art without leaving the scope of the invention. Therefore, it is clear that a plurality of variation possibilities exists. It is also clear that embodiments mentioned as examples really represent only examples that in no way should be considered to be a limitation of the scope of protection, the application possibilities or the configuration of the invention. Rather, the above description and the description of the figures put the person skilled in the art in the position to concretely implement the example embodiments, wherein the person skilled in the art, in the knowledge of the disclosed inventive ideas, can proceed with a wide variety of changes, for example, with regard to the function or the arrangement of individual elements mentioned in an example embodiment, without leaving the scope of protection defined by the claims and their legal equivalents such as, for example, further explanations in the description.

LIST OF REFERENCE NUMERALS

101 First means
102 Second means
103 Third means
104 Radar system
201-209 Method steps

The invention claimed is:

1. A device to determine a position of a vehicle on or above a planet surface, the device comprising:
  a first means for determining a first position P1(t) of the vehicle;
  a second means for determining a movement direction BR(t) of the vehicle;
  a third means for providing a number n of fixed point data, wherein the fixed point data specify, at least for significant first radar objects $FRO_i$ arranged in a stationary manner on the planet surface, first radar signatures $RS_{FROi}$ and first positions $P_{FROi}$ of the significant first radar objects $FRO_i$, where i=1, 2, ..., n;
  a radar system with a radar sensor arranged on the vehicle to scan a current surrounding area of the vehicle using radio-frequency radiation and to continuously detect radar data obtained by the radar sensor, wherein, for a number m of second radar objects $RO_k(t)$ present in the surrounding area, second radar signatures $RS_k(t)$ and second relative positions $\Delta P_{Ok(t)}$ of the second radar objects $RO_k(t)$ in relation to the vehicle are determinable from the radar data, where k=0, 1, 2, ..., m, and wherein the radar system is configured and set up in such a way that
    in the fixed point data, depending on the first position P1(t), from the first radar objects $FRO_i$, third radar objects $FRO_i^*$ with associated third radar signatures $RS_{FROi^*}$ and third positions $P_{FROi^*}$ are determinable whose third positions $P_{FROi}*$ are in a predeterminable area, depending on the movement direction BR(t), around the current first position P1(t) of the vehicle, the third radar signatures $RS_{FROi*}$ of the third radar objects $FRO_i*$ are compared with the second radar signatures $RS_k(t)$ of the second radar objects $RO_k(t)$, and fourth radar objects $RO_k(t)*$ for which second radar signatures $RS_k(t)$ equal to third radar signatures $RS_{FROi*}$ are determinable, wherein, if this condition is met, it is assumed that the fourth radar objects $RO_k(t)*$ are equal to the third radar objects $FRO_i*$, and fourth positions $P_{ROk(t)*}$ are equal to the third positions $P_{FROi*}$ for the fourth positions $P_{ROk(t)*}$ of the fourth radar objects $RO_k(t)*$, on the basis of the radar data, fourth relative positions $\Delta P_{Ok(t)*}$ of the respective fourth radar objects $RO_k(t)*$ relative to the vehicle are determined, and on the basis in each case of the fourth positions $P_{ROk(t)*}$ and the fourth relative positions $\Delta P_{Ok(t)*}$, a second position P2(t) of the vehicle is determined; and wherein the first means is configured and set up in such a way that the first position P1(t) of the vehicle is correctable on the basis of the determined second position P2(t) and/or a position warning is issuable if the first position P1(t) and the second position P2(t) differ from one another by more than a predetermined limit value.

2. The device according to claim 1, wherein the first means is a satellite-based and/or inertia-based position determination system.

3. The device according to claim 1, wherein the fixed point data are generated on the basis of radar data in which the planet surface and the first radar objects $FRO_i$ arranged thereon are represented in a top view.

4. The device according to claim 3, wherein:
for at least some of the significant first radar objects $FRO_i$, the fixed point data comprise optical data $OD_i$ which visually characterize corresponding first radar objects $FRO_i$;
the radar system has an optical sensor to continually acquire image data BD(t) of the current surrounding area of the vehicle; and
the radar system is configured and set up in such a way that the image data BD(t) are used to verify the second radar objects $RO_k(t)$ detected in the current surrounding area of the vehicle.

5. The device according to claim 1, wherein data contained in the fixed point data on the first positions $P_{FROi}$ of the first radar objects $FRO_i$ have a position accuracy in a range of <50 cm, <30 cm, <25 cm, <10 cm, or <5 cm.

6. The device according to claim 1, wherein the position of the vehicle is determined in a transport route network on the planet surface.

7. A vehicle comprising a device to determine a position of the vehicle on or above a planet surface, the device comprising:
a first means for determining a first position P1(t) of the vehicle;
a second means for determining a movement direction BR(t) of the vehicle;
a third means for providing a number n of fixed point data, wherein the fixed point data specify, at least for significant first radar objects $FRO_i$ arranged in a stationary manner on the planet surface, first radar signatures $RS_{FROi}$ and first positions $P_{FROi}$ of the significant first radar objects $FRO_i$, where i=1, 2, ..., n;
a radar system with a radar sensor arranged on the vehicle to scan a current surrounding area of the vehicle using radio-frequency radiation and continuously determine radar data obtained by the radar sensor, wherein, for a number m of second radar objects $RO_k(t)$ present in the surrounding area, second radar signatures $RS_k(t)$ and second relative positions $\Delta P_{Ok(t)}$ of the second radar objects $RO_k(t)$ in relation to the vehicle are determinable from the radar data, where k=0, 1, 2, ..., m, and wherein the radar system is configured and set up in such a way that in the fixed point data, depending on the first position P1(t), from the first radar objects $FRO_i$, third radar objects $FRO_i*$ with associated third radar signatures $RS_{FROi*}$ and third positions $P_{FROi*}$ are determinable whose third positions $P_{FROi*}$ are in a predeterminable area, depending on the movement direction BR(t), around the current first position P1(t) of the vehicle, the third radar signatures $RS_{FROi*}$ of the third radar objects $FRO_i*$ are compared with the second radar signatures $RS_k(t)$ of the second radar objects $RO_k(t)$, and fourth radar objects $RO_k(t)*$ for which the second radar signatures $RS_k(t)$ equal to third radar signatures $RS_{FROi*}$ are determinable, wherein, if this condition is met, it is assumed that the fourth radar objects $RO_k(t)*$ are equal to the third radar objects $FRO_i*$, and fourth positions $P_{ROk(t)*}$ are equal to the third positions $P_{FROi*}$ for the fourth positions $P_{ROk(t)*}$ of the fourth radar objects $RO_k(t)*$, on the basis of the radar data, fourth relative positions $\Delta P_{Ok(t)*}$ of the respective fourth radar objects $RO_k(t)*$ relative to the vehicle are determined, and on the basis in each case of the fourth positions $P_{ROk(t)*}$ and the relative fourth positions $\Delta P_{Ok(t)*}$, a second position P2(t) of the vehicle is determined; and wherein the first means is configured and set up in such a way that the first position P1(t) of the vehicle is correctable on the basis of the determined second position P2(t) and/or a position warning is issuable if the first position P1(t) and the second position P2(t) differ from one another by more than a predetermined limit value.

8. The vehicle according to claim 7, wherein the first means is a satellite-based and/or inertia-based position determination system.

9. The vehicle according to claim 7, wherein the fixed point data are generated on the basis of radar data in which the planet surface and the first radar objects $FRO_i$ arranged thereon are represented in a top view.

10. The vehicle according to claim 9, wherein:
for at least some of the significant radar objects $FRO_i$, the fixed point data comprise optical data $OD_i$ which visually characterize corresponding first radar objects $FRO_i$;
the radar system has an optical sensor to continually acquire image data BD(t) of the current surrounding area of the vehicle; and
the radar system is configured and set up in such a way that the image data BD(t) are used to verify the second radar objects $RO_k(t)$ detected in the current surrounding area of the vehicle.

11. The vehicle according to claim 7, wherein the data contained in the fixed point data on the first positions $P_{FROi}$ of the first radar objects $FRO_i$ have a position accuracy in a range of <50 cm, <30 cm, <25 cm, <10 cm, or <5 cm.

12. The vehicle according to claim 7, wherein the position of the vehicle is determined in a transport route network on the planet surface.

13. The vehicle according to claim 7, wherein the vehicle is motor vehicle.

14. A method of determining a position of a vehicle on or above a planet surface, the method comprising:
- determining a first position P1(t) of the vehicle;
- determining a movement direction BR(t) of the vehicle;
- provisioning a number n of fixed point data, wherein the fixed point data specify, at least for significant first radar objects $FRO_i$ arranged in a stationary manner on the planet surface, first radar signatures $RS_{FROi}$ and first positions $P_{FROi}$ of the significant first radar objections $FRO_i$, where i=1, 2, ..., n;
- scanning a current surrounding area of the vehicle using radio-frequency radiation and continuously acquiring radar data obtained using the radio-frequency radiation, wherein, from the radar data, for a number m of second radar objects $RO_k(t)$ present in the surrounding area, second radar signatures $RS_k(t)$ and second relative positions $\Delta P_{Ok(t)}$ of the second radar objects $RO_k(t)$ relative to the vehicle are determined, where k=0, 1, 2, ..., m;
- in the fixed point data, depending on the first position P1(t), from the first radar objects $FRO_i$, determining third radar objects $FRO_i^*$ with associated third radar signatures $RS_{FROi^*}$ and third positions $P_{FROi^*}$, whose third positions $P_{FROi}^*$ are in a predeterminable area, depending on the movement direction BR(t), around the current first position P1(t) of the vehicle;
- comparing the third radar signatures $RS_{FROi^*}$ of the third radar objects $FRO_i^*$ with the second radar signatures $RS_k(t)$ of the second radar objects $RO_k(t)$ and determining fourth radar objects $RO_k(t)^*$ for which second radar signatures $RS_k(t)$ are equal to third radar signatures $RS_{FROi^*}$, wherein, if this condition is met, it is assumed that the fourth radar objects $RO_k(t)^*$ are equal to the third radar objects $FRO_i^*$, and fourth positions $P_{ROk(t)^*}$ are equal to the third positions $P_{FROi^*}$ for the fourth positions $P_{ROk(t)^*}$ of the fourth radar objects $RO_k(t)^*$;
- on the basis of the radar data, determining fourth relative positions $\Delta P_{Ok(t)^*}$ of the respective fourth radar objects $RO_k(t)^*$ relative to the vehicle;
- on the basis in each case of the fourth positions $P_{ROk(t)^*}$ and the fourth relative positions $\Delta P_{Ok(t)^*}$, determining a second position P2(t) of the vehicle; and
- wherein the first position P1(t) of the vehicle is corrected on the basis of the determined second position P2(t) and/or a position warning is issued if the first position P1(t) and the second position P2(t) differ from one another by more than a predetermined limit value.

15. The method according to claim 14, wherein the method comprises generating the fixed point data on the basis of remote exploration radar data, in which the planet surface and the first radar objects $FRO_i$ arranged thereon are represented in a top view.

16. The method according to claim 15, wherein the method comprises acquiring the remote exploration radar data by an aircraft-borne or a satellite-borne radar sensor.

17. The method according to claim 14, wherein the method comprises:
- providing the fixed point data that comprise optical data $OD_i$, which visually characterize the corresponding first radar objects $FRO_i$, for at least some of the significant first radar objects $FRO_i$;
- continually acquiring image data BD(t) of the current surrounding area of the vehicle using an optical sensor; and
- using the image data BD(t) to verify the second radar objects $RO_k(t)$ detected in the current surrounding area of the vehicle.

18. The method according to claim 14, wherein the position of the vehicle is determined in a transport route network on the planet surface.

* * * * *